United States Patent
Berger et al.

(10) Patent No.: US 8,020,204 B2
(45) Date of Patent: *Sep. 13, 2011

(54) METHOD AND APPARATUS FOR MIGRATING A VIRTUAL TPM INSTANCE AND PRESERVING UNIQUENESS AND COMPLETENESS OF THE INSTANCE

(75) Inventors: Stefan Berger, New York, NY (US); Kenneth A. Goldman, Norwalk, CT (US); Reiner Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/114,133

(22) Filed: May 2, 2008

(65) Prior Publication Data

US 2009/0328145 A1 Dec. 31, 2009

Related U.S. Application Data

(63) Continuation of application No. 11/385,965, filed on Mar. 21, 2006, now Pat. No. 7,444,670.

(51) Int. Cl.
  *G06F 21/00* (2006.01)
  *H04L 9/32* (2006.01)
(52) U.S. Cl. .......................... 726/16; 713/189
(58) Field of Classification Search .................. 726/3, 9; 709/227, 229; 713/161, 168; 345/418
See application file for complete search history.

(56) References Cited

U.S. PATENT DOCUMENTS

| | | | |
|---|---|---|---|
| 5,692,193 A * | 11/1997 | Jagannathan et al. | 718/106 |
| 7,095,859 B2 * | 8/2006 | Challener | 380/282 |
| 7,099,477 B2 * | 8/2006 | Bade et al. | 380/279 |
| 7,243,230 B2 * | 7/2007 | England et al. | 713/168 |
| 2005/0086509 A1 * | 4/2005 | Ranganathan | 713/200 |
| 2006/0020781 A1 * | 1/2006 | Scarlata et al. | 713/100 |
| 2006/0256106 A1 * | 11/2006 | Scarlata et al. | 345/418 |
| 2008/0046581 A1 * | 2/2008 | Molina et al. | 709/229 |

OTHER PUBLICATIONS

Berger et al., "IBM Research Report RC23879, vTPM: Virtualizing the Trusted Platform Module", IBM Research Report, San Jose, CA, No. RC23878, Feb. 14, 2006, pp. 1-18.
EP Search Report for application EP07753405 dated Jul. 29 2010.

* cited by examiner

*Primary Examiner* — Gilberto Barron, Jr.
*Assistant Examiner* — Abdulhakim Nobahar
(74) *Attorney, Agent, or Firm* — Yee & Associates, P.C.; Preston J. Young

(57) ABSTRACT

A migration scheme for virtualized Trusted Platform Modules is presented. The procedure is capable of securely migrating an instance of a virtual Trusted Platform Module from one physical platform to another. A virtual Trusted Platform Module instance's state is downloaded from a source virtual Trusted Platform Module and all its state information is encrypted using a hybrid of public and symmetric key cryptography. The encrypted state is transferred to the target physical platform, decrypted and the state of the virtual Trusted Platform Module instance is rebuilt.

31 Claims, 14 Drawing Sheets

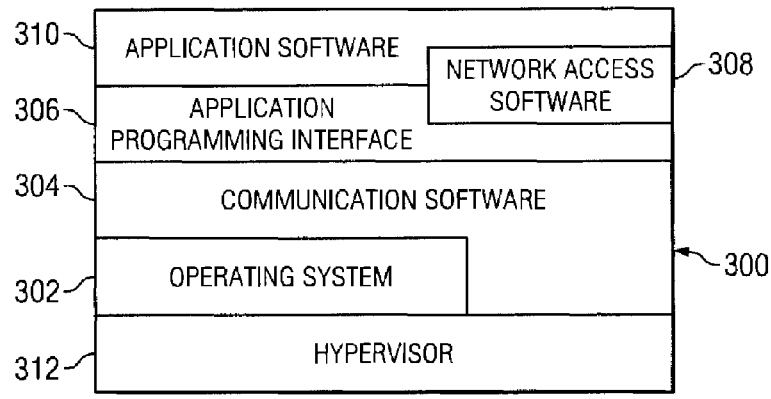
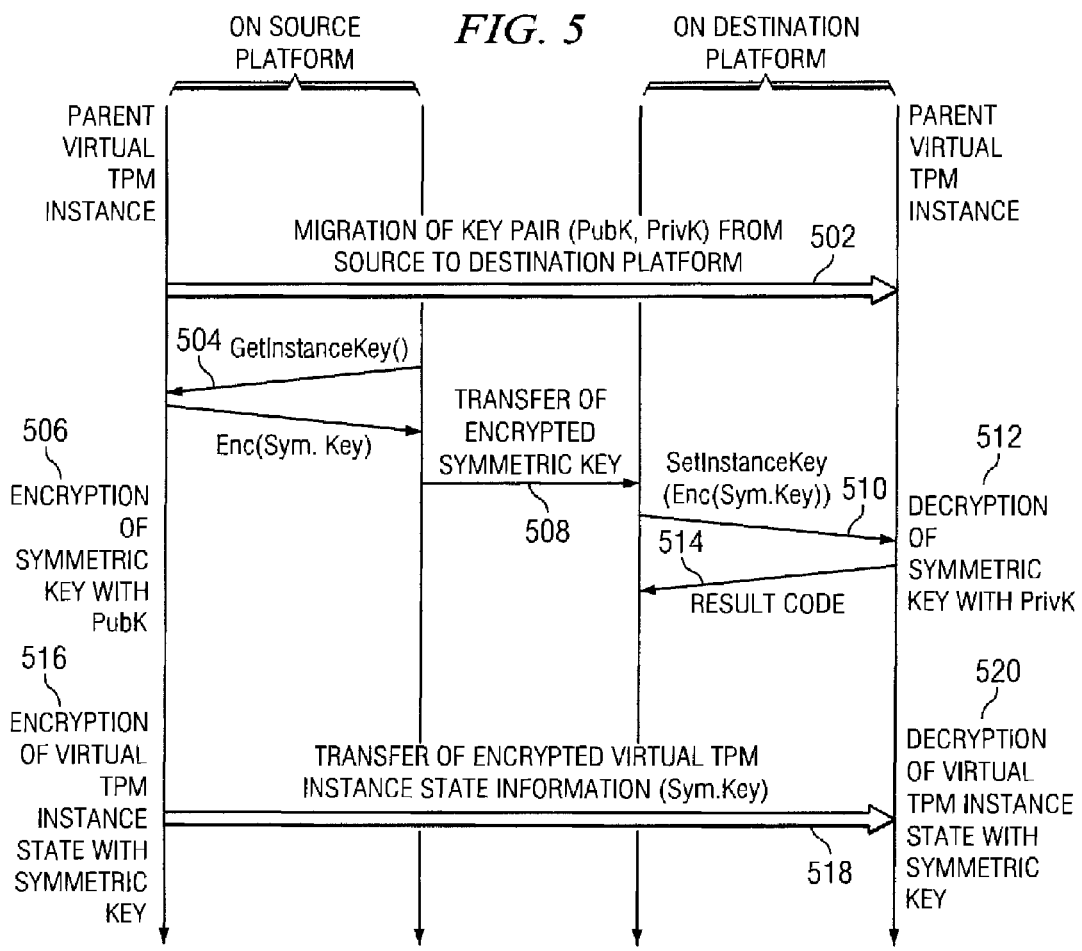

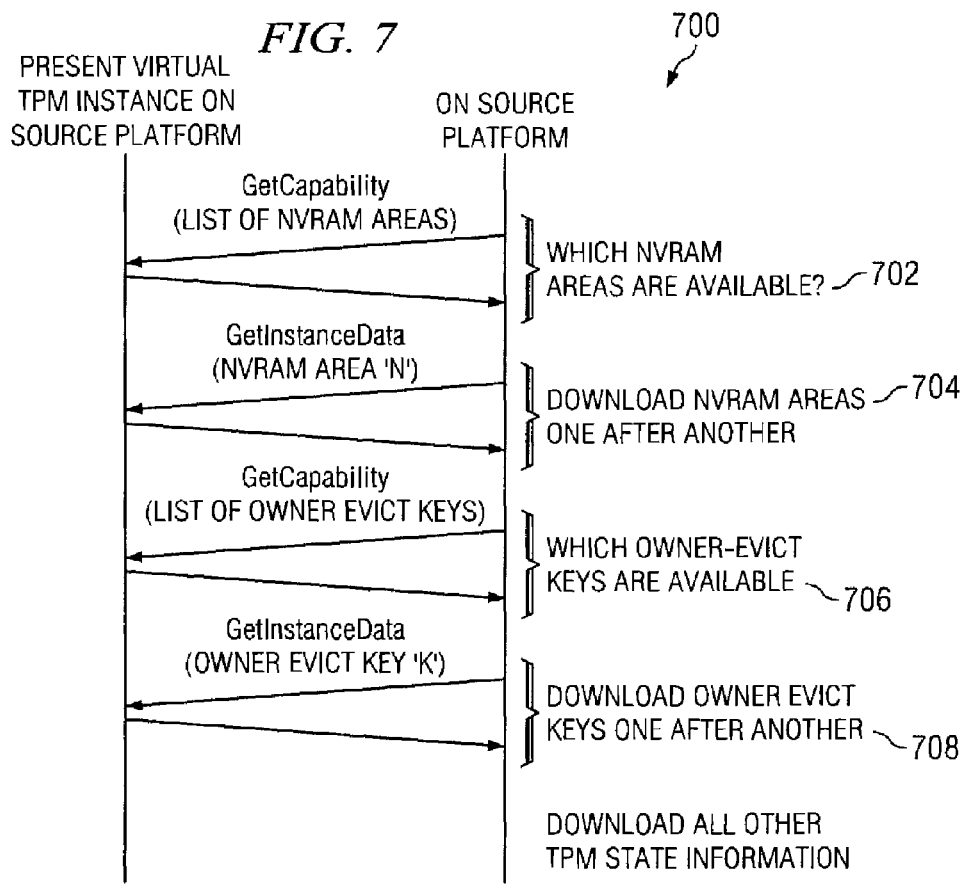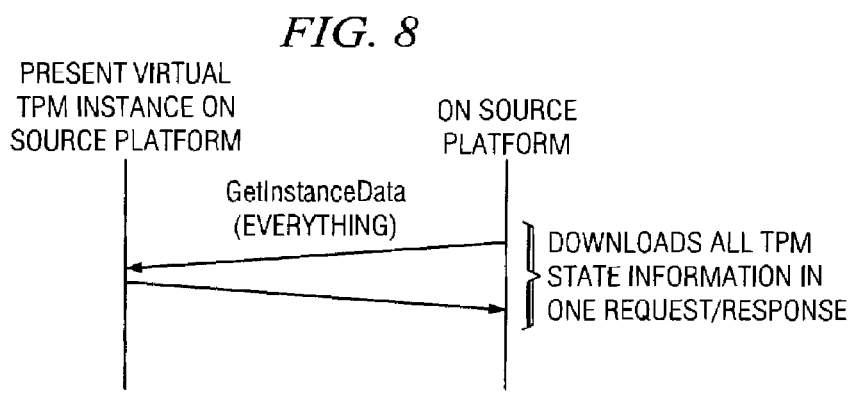

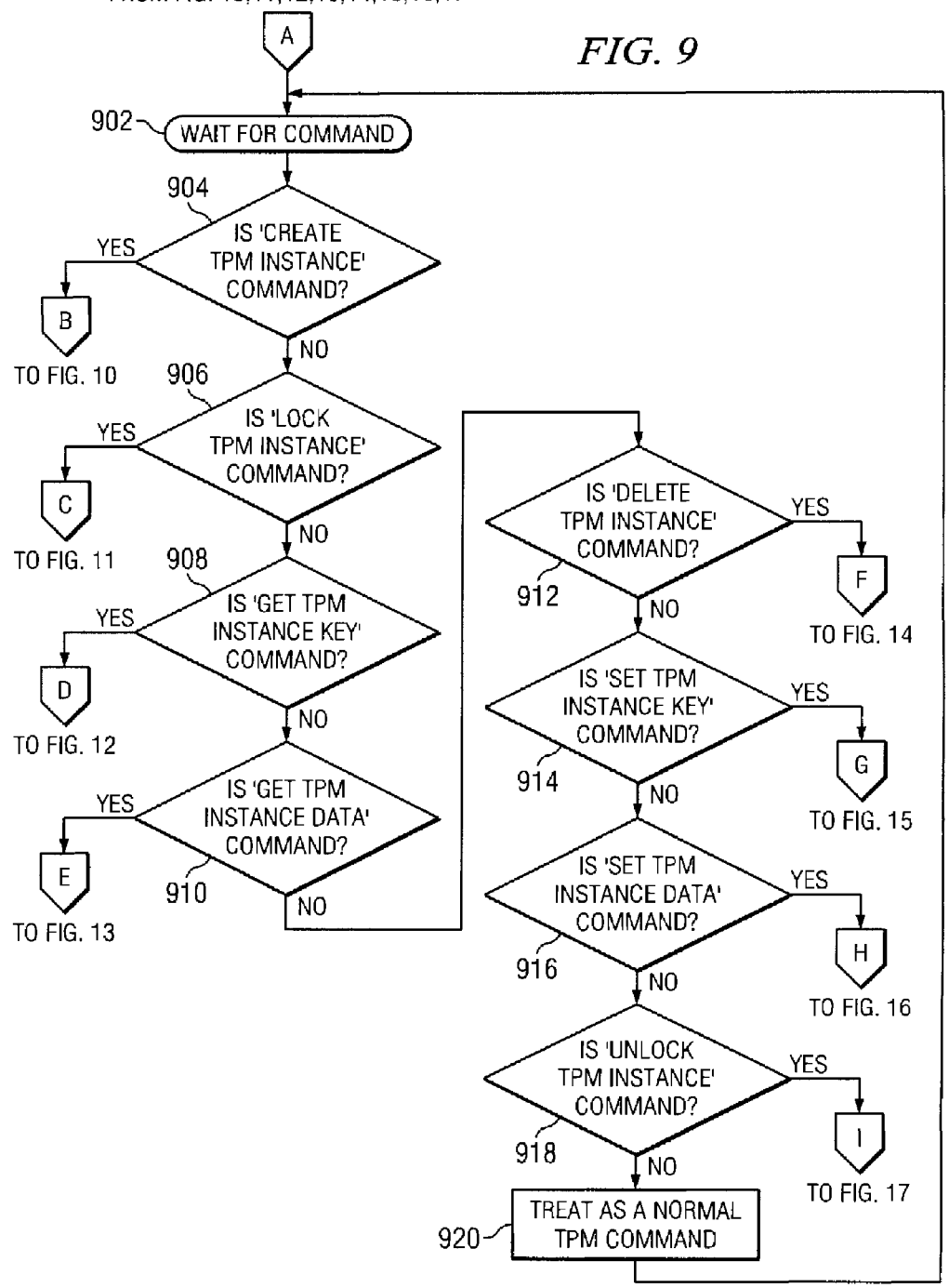

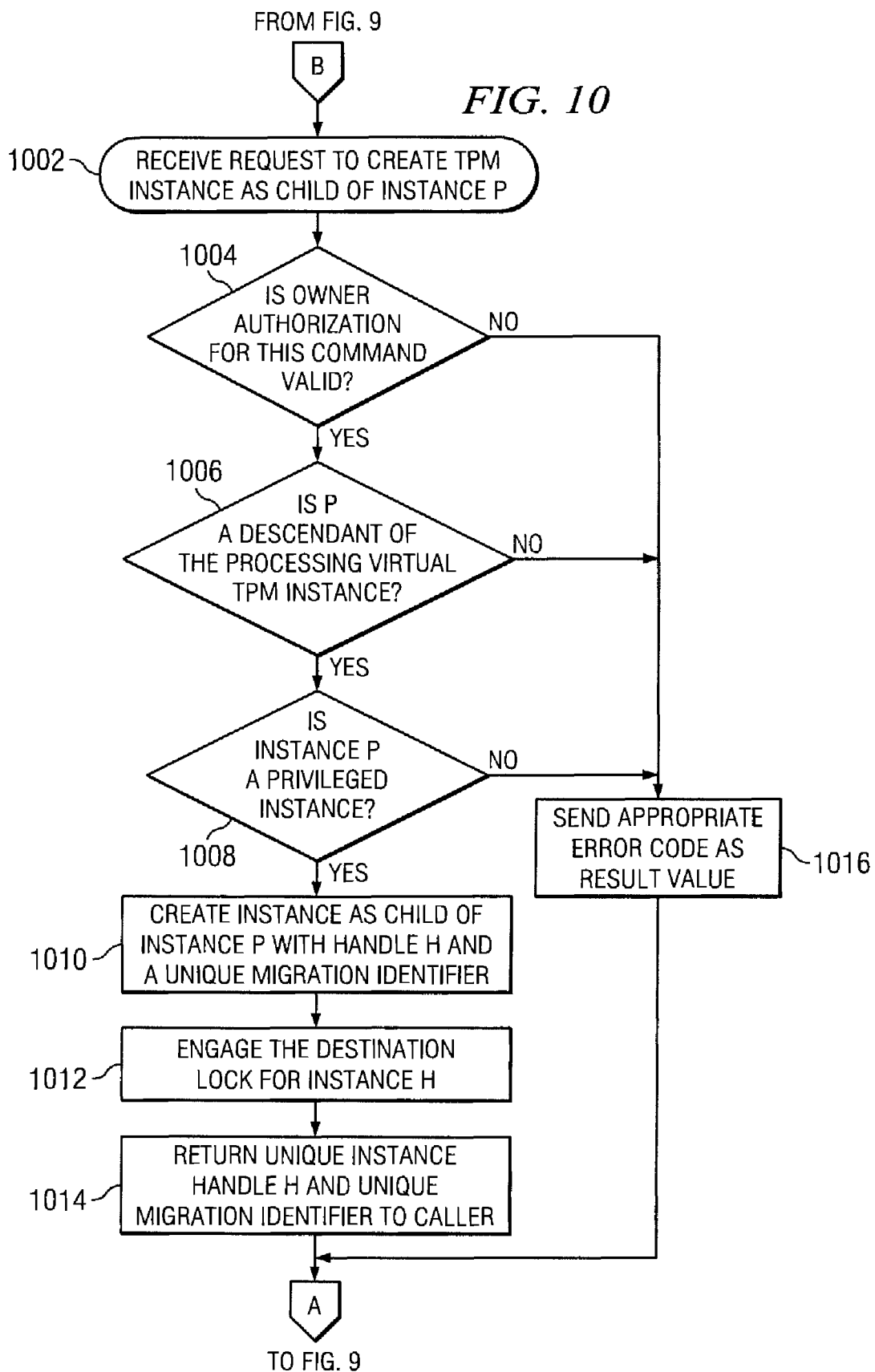

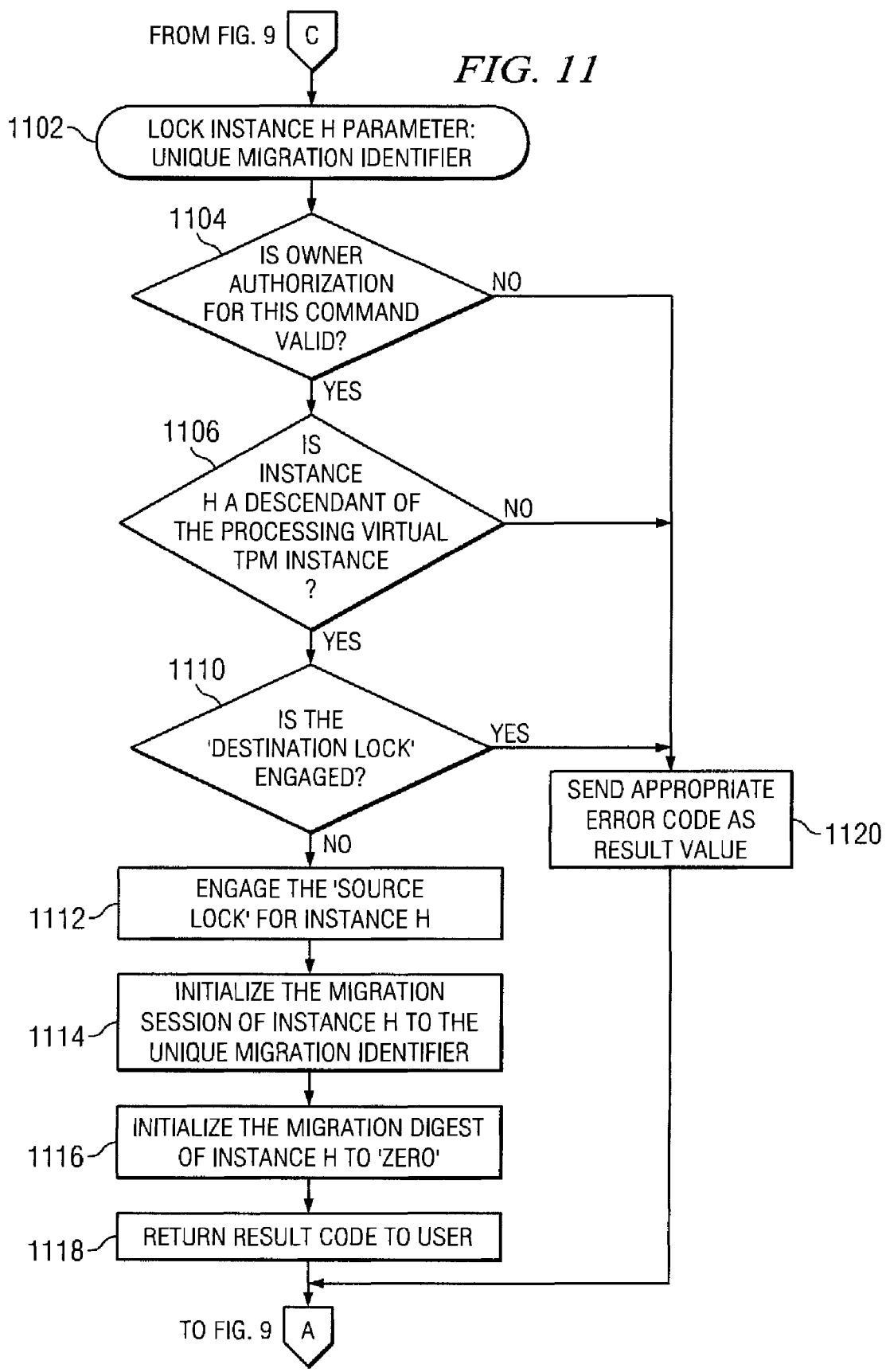

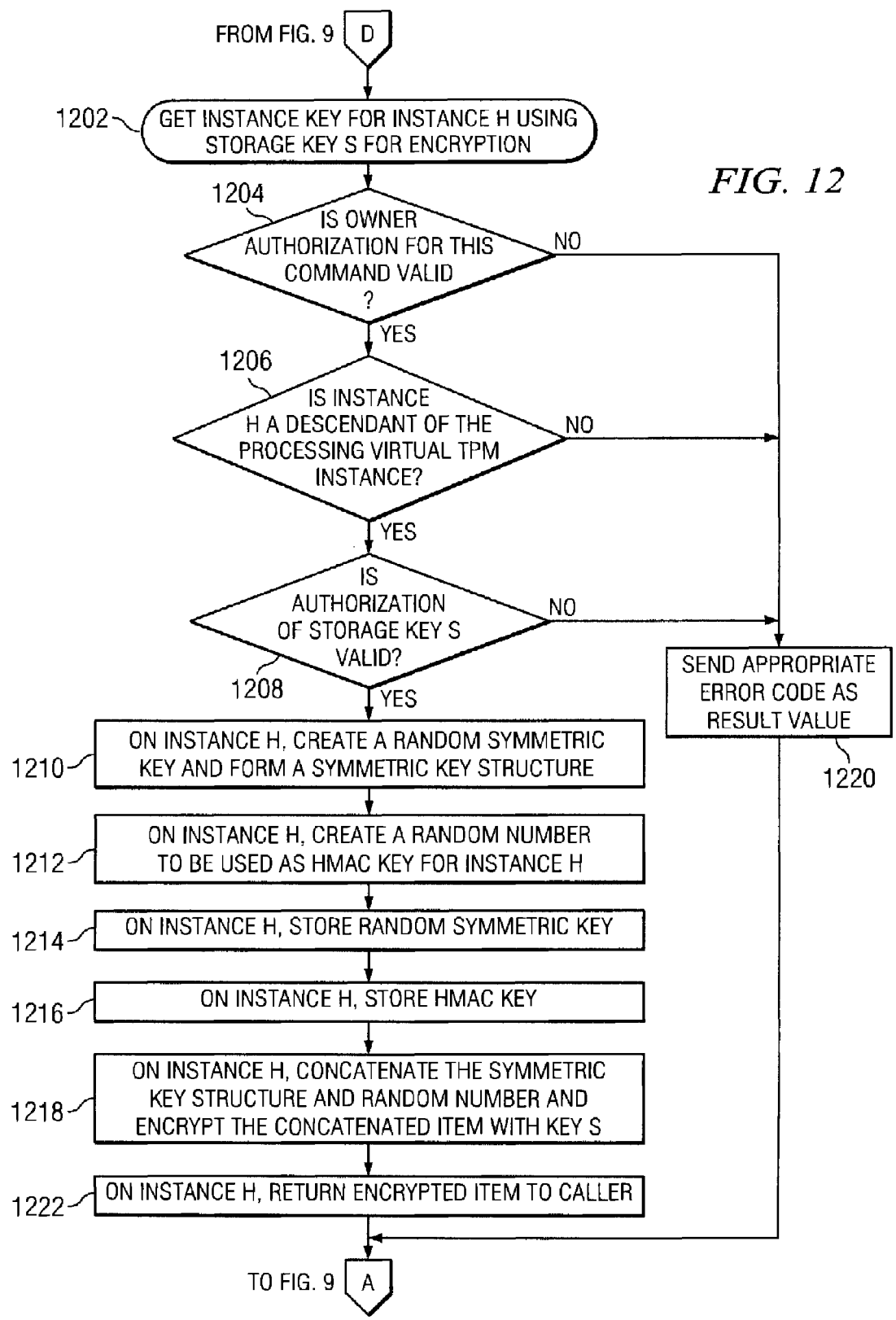

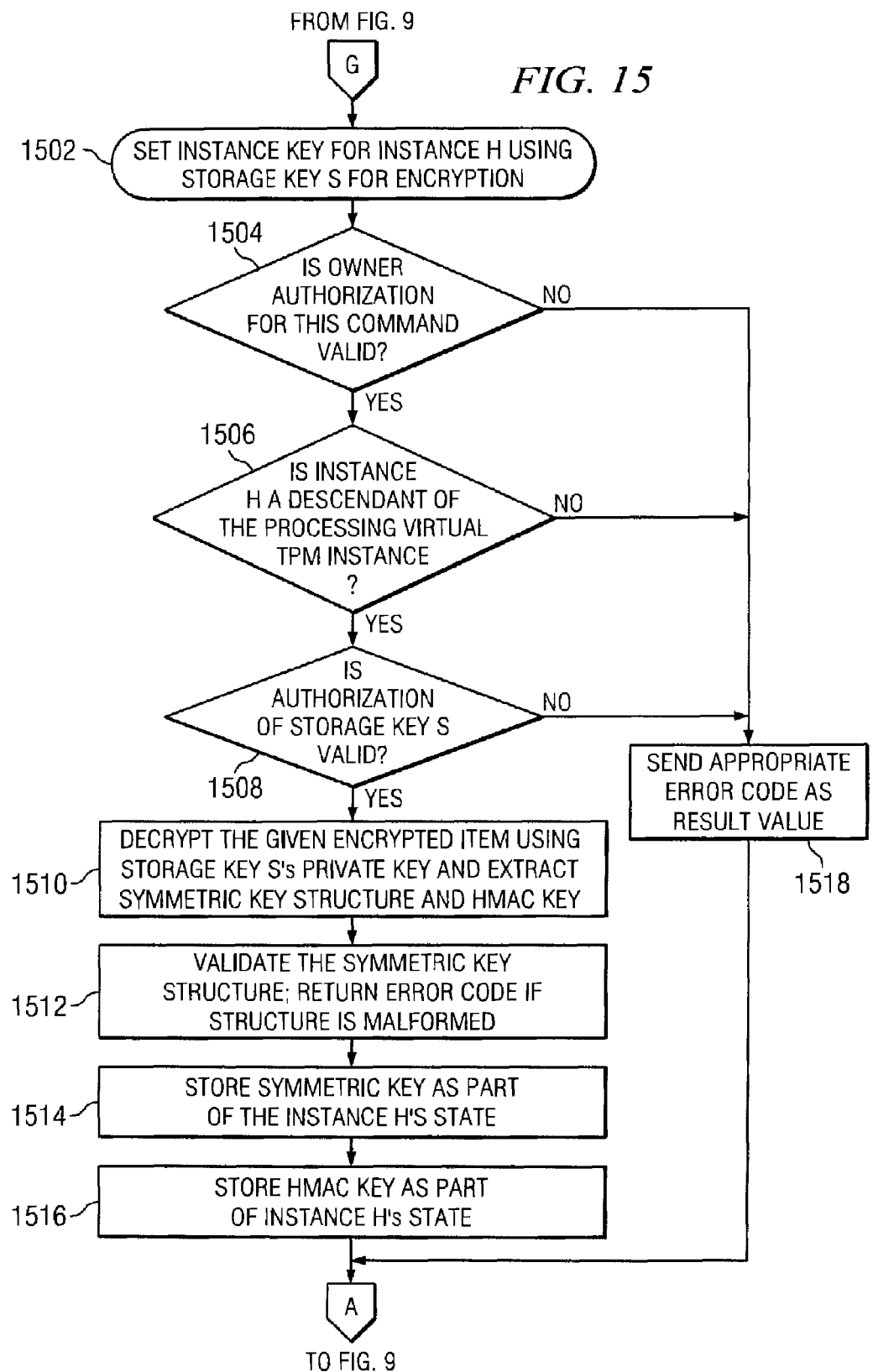

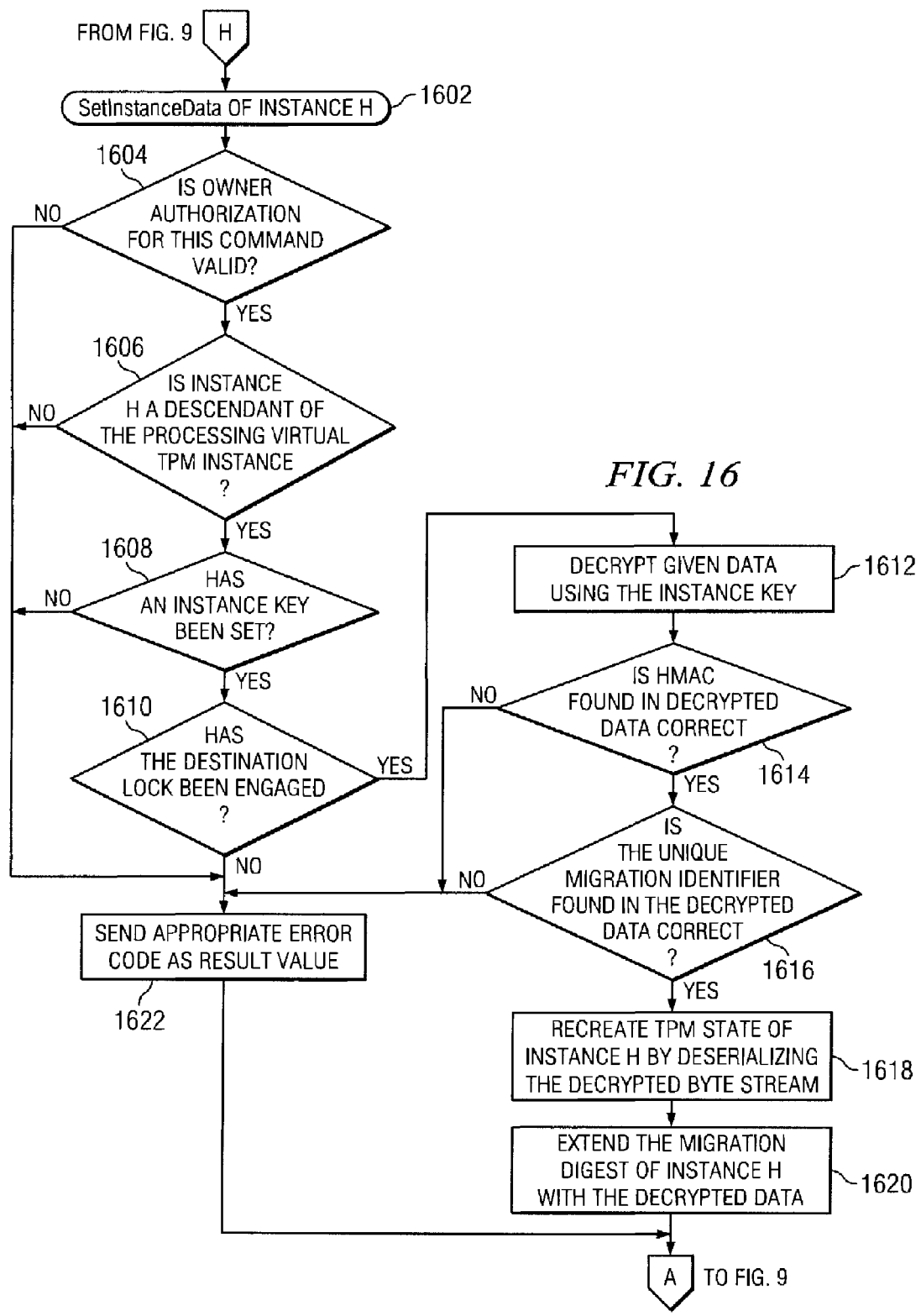

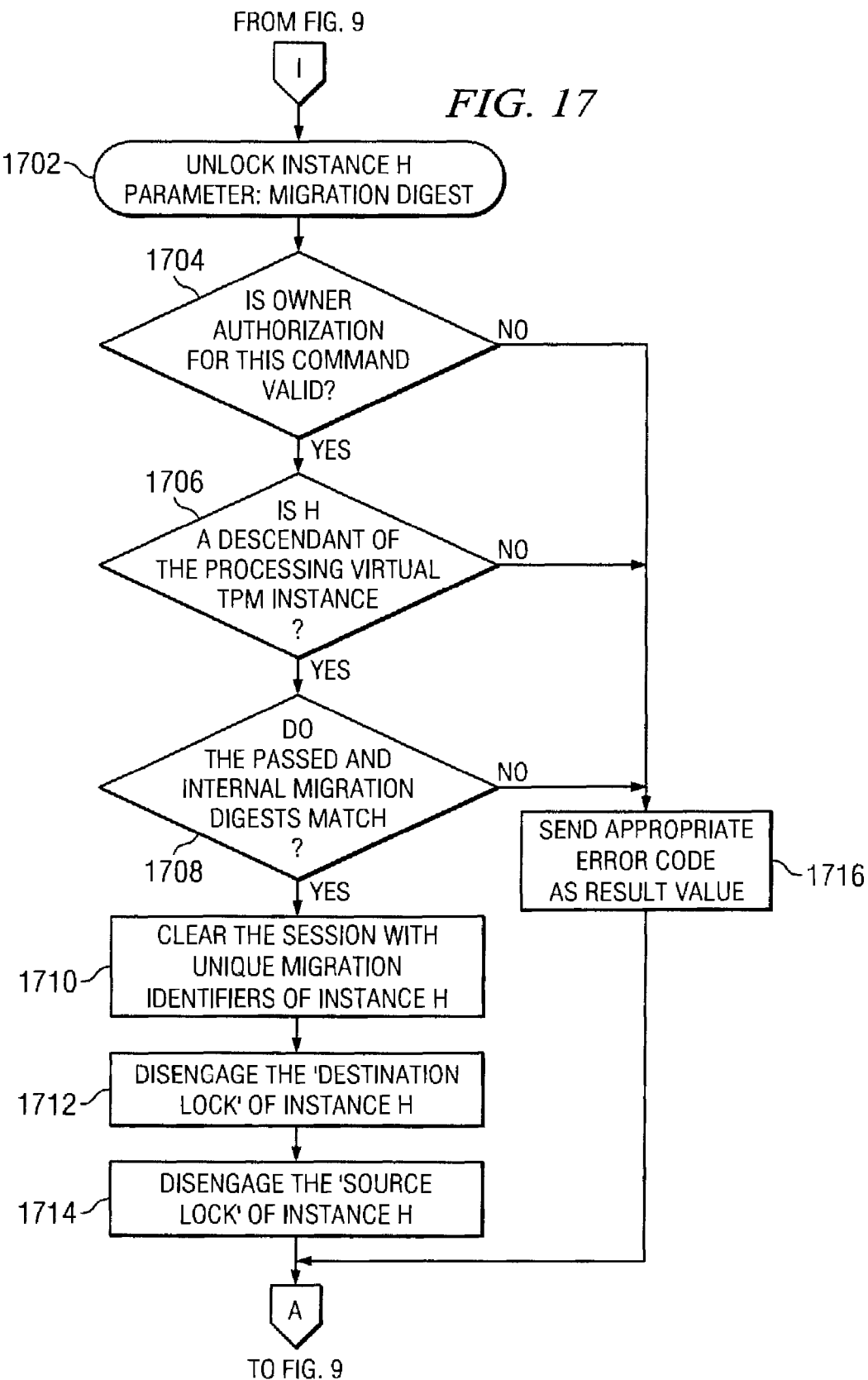

METHOD AND APPARATUS FOR MIGRATING A VIRTUAL TPM INSTANCE AND PRESERVING UNIQUENESS AND COMPLETENESS OF THE INSTANCE

This application is a continuation of application Ser. No. 11/385,965 filed Mar. 21, 2006, now U.S. Pat. No. 7,444,670.

BACKGROUND OF THE INVENTION

1. Field of the Invention

The present invention relates generally to the data processing field. Specifically, the present invention provides a computer implemented method, a data processing system, and a computer program product for migrating a virtual Trusted Platform Module instance.

2. Description of the Related Art

The Trusted Computing Group has defined the functionality and protocol for a hardware module called the Trusted Platform Module (TPM). This piece of hardware offers security and cryptographic functionality to computer systems such as, for example, asymmetric key generation, decryption, encryption, signing, sealing and binding of data to the state of the TPM, migration of keys between TPMs, random number generation and hashing functionality. A TPM also holds state in forms of stored keys, non-volatile memory areas and platform configuration registers.

Many hardware vendors ship their computing systems equipped with a TPM soldered to the motherboard, which allows widespread usage of the TPM by operating systems such as Linux® or Windows®.

The interest in support for trusted computing on virtualizeable systems is growing as hardware virtualization becomes available for common, off the shelf hardware. Being able to run multiple operating systems on one machine will not remain an area reserved for high-end servers but will become widely available. To support trusted computing for each operating system on a virtualized system, a virtual Trusted Platform Module is preferred to be made available that makes each such operating system think that it is talking to its own private TPM.

Virtualization support for an operating system is enabled through an additional software layer underneath operating systems running on a platform. Whereas usually operating systems are running directly on the hardware, in a virtualizeable system a layer called a 'hypervisor' or 'virtual machine monitor' is implementing a virtual machine where an operating system can be run inside. The hypervisor becomes the lowest software layer in the system.

Modern virtualization technologies enable the migration of a virtual machine from one platform to another one. If the operating system inside the virtual machine is associated with a virtual TPM, then that virtual TPM is desired to be able to migrate its state to the new platform such that TPM functionality is available on the target platform.

SUMMARY OF THE INVENTION

Various aspects of the invention describe a computer implemented method and a data processing system for securely migrating an instance of a virtual TPM from one platform to another. During the process of migration the uniqueness of the virtual TPM instance is preserved. It is also secured that only the complete and unmodified state of the virtual TPM instance is migrated such that attempts to omit or alter state of the virtual TPM instance are detected. All state information that is transferred is encrypted by the virtual TPM on the source platform and is decrypted by the virtual TPM on the destination platform.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram showing typical software architecture for a server or client system in accordance with a preferred embodiment of the present invention;

FIG. 5 is a diagram of information flow that describes the high level procedure of migrating a virtual TPM instance from a source platform to a destination platform, in accordance with an exemplary embodiment of the present invention;

FIG. 7 is a diagram of information flow for exporting the state information of a virtual TPM instance in multiple steps, in accordance with an exemplary embodiment of the present invention;

FIG. 8 is a diagram of information flow for exporting the state information of a virtual TPM instance in a single step, in accordance with an exemplary embodiment of the present invention;

FIG. 9 is a flowchart illustrating the operation of handling TPM commands, in accordance with an exemplary embodiment of the present invention;

FIG. 10 is a flowchart illustrating the operation of handling the command for creation of a virtual TPM instance in accordance with an exemplary embodiment of the present invention;

FIG. 11 is a flowchart illustrating the operation of handling the command for locking of a virtual TPM instance in accordance with an exemplary embodiment of the present invention;

FIG. 12 is a flowchart illustrating the operation of handling the command for getting a virtual TPM instance key in accordance with an exemplary embodiment of the present invention;

FIG. 15 is a flowchart illustrating the operation of handling the command for setting a virtual TPM instance key in accordance with an exemplary embodiment of the present invention;

FIG. 16 is a flowchart illustrating the operation of handling the command for setting virtual TPM instance data in accordance with an exemplary embodiment of the present invention; and FIG. 17 is a flowchart illustrating the operation of handling the command for unlocking a virtual TPM instance in accordance with an exemplary embodiment of the present invention.

DETAILED DESCRIPTION OF THE PREFERRED EMBODIMENT

Figure 1:
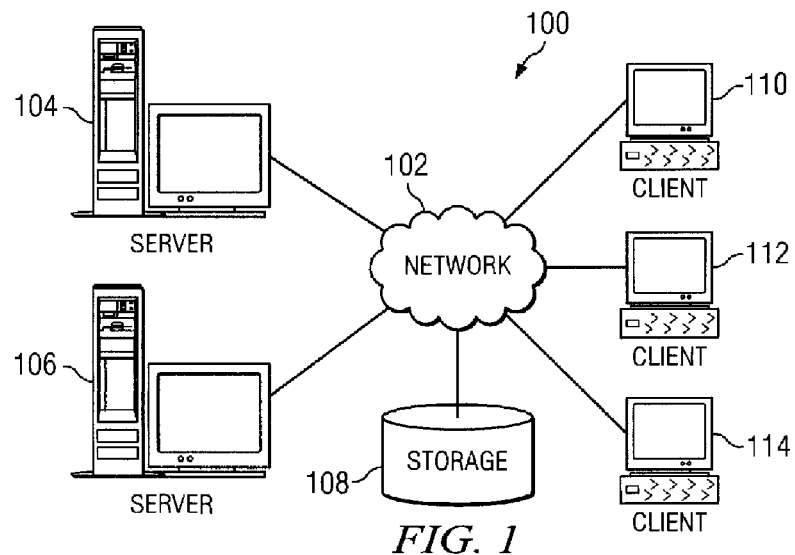
FIG. 1 is a pictorial representation of a network of data processing systems in which exemplary aspects of the present invention may be implemented.
Figure 2:
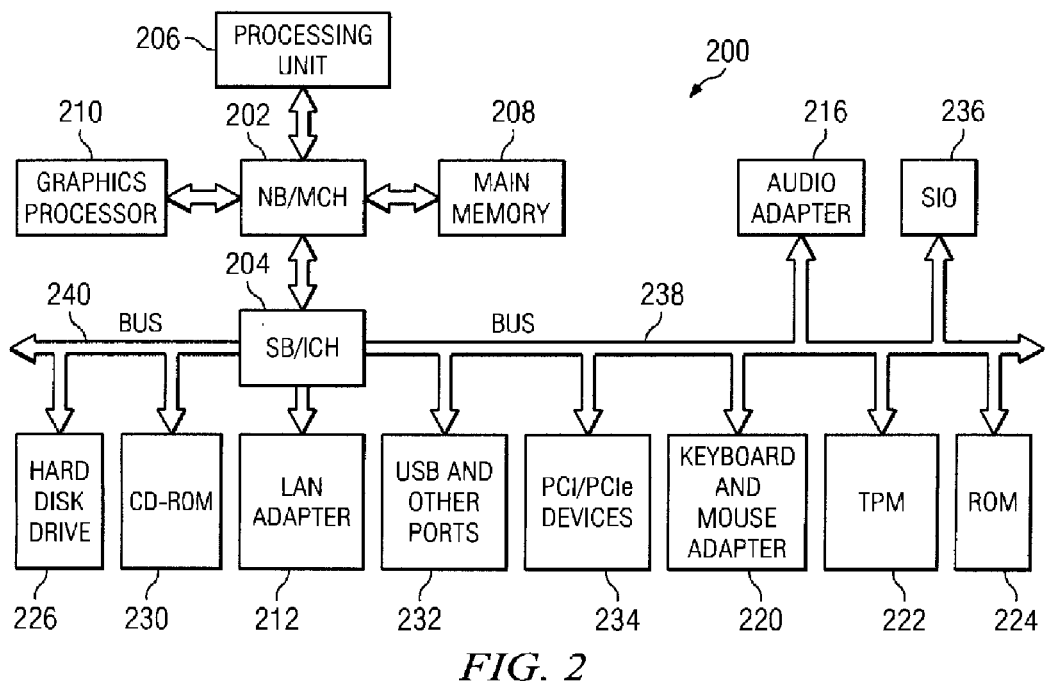
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, LAN adapter 212 connects to south bridge and I/O controller hub 204. Audio adapter 216, keyboard and mouse adapter 220, TPM 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers, and TPM 222. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pseries® computer system, running the Advanced Interactive Executive (AIX®) operating system or LINUX operating system (eServer, pseries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Turning to FIG. 3, typical software architecture, generally designated by reference number 300, for a server-client system is depicted in accordance with a preferred embodiment of the present invention. Operating system 302 is utilized to provide high-level functionality to the user and to other software. Operating system 302 may be implemented in server 104 or client 110 in FIG. 1, in which computer usable code or instructions implementing the processes for embodiments of the present invention may be located. Such an operating system typically includes BIOS. Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a LAN, WAN, or the Internet. With the Internet, this software may include programs, such as Web browsers.

Application software 310 represents any number of software applications designed to react to data through a communications port to provide the desired functionality the user seeks. Applications at this level may include those necessary to handle data, video, graphics, photos or text, which can be accessed by users of the Internet. Hypervisor 312 is a layer of software running on a platform that allows multiple instances of operating systems to be running simultaneously.

The TPM is a security specification defined by the Trusted Computing Group. The implementation of a TPM is available as a chip that is physically attached to the platform's motherboard and controlled by software running on the system using well-defined commands. The TPM provides cryptographic operations such as asymmetric key generation, decryption, encryption, signing, migration of keys between TPMs, as well as random number generation and hashing. The TPM also provides secure storage for small amounts of information such as cryptographic keys.

Computer systems that have the capability of running multiple operating systems at the same time will desire to extend support for trusted computing in a similar way as it has been made available for single operating system environments. In such a case, each virtual machine needs to have access to its own TPM. For the purposes of this application, such a TPM is referred to as a virtual TPM instance, which is spawned by an entity called a virtual TPM.

Each operating system is offered its own virtual TPM instance. In an exemplary embodiment of the present invention, the normal command set that a TPM understands is expanded to enable the download of the complete state of a virtual TPM instance, such as, for example, non-volatile RAM (NV RAM) areas, and internally held keys into a file and recreating the virtual TPM state in another multi-instance capable virtual TPM and resuming operation there.

This particular extension enables migration of a virtual TPM instance along with an operating system running inside of a virtual machine from one physical platform to another physical platform. All downloaded state from the virtual TPM instance is encrypted with a symmetric key. The symmetric key is also downloaded, but will itself be encrypted by a migrateable storage key. To recreate the state of a virtual TPM instance on another system, the migrateable storage key is preferred to be made available there first in order to be able to use the symmetric key that is securely kept in encrypted form. The possibility of virtual TPM instance migration between systems requires interoperability on several levels. First, virtual TPM implementations should implement the same extended command set that allows the migration of the virtual TPM instance. Second, the virtual TPM instance state that the source platform application is writing to a file should be readable by a tool or application on the target system.

For an exemplary embodiment of the present invention, it is assumed that a hierarchy of virtual TPM instances has been formed where a parent virtual TPM instance has control over the life-cycle of its child instances. A parent virtual TPM instance can, for example, create new virtual TPM child instances as well as retrieve their state information or delete them.

In an exemplary embodiment of the present invention, a virtual TPM instance is downloaded from a source platform and all its state information is encrypted by a parent virtual TPM instance on the source platform using a hybrid of public and symmetric key cryptography. The encrypted state is transferred to the target physical platform, decrypted and the state of the virtual TPM instance is rebuilt.

In another exemplary embodiment, the uniqueness of the migrated virtual TPM instance is preserved by ensuring that the trusted platform module can only be recreated on one single target platform. In another exemplary embodiment, integrity data ensures that only the full and unmodified state of the migrated virtual TPM instance can be recreated. In another exemplary embodiment of the present invention, the to-be-migrated virtual TPM instance's state is destroyed on the source platform.

In another exemplary embodiment of the present invention, support for a client system is provided. A client could request to migrate a virtual TPM instance. In one exemplary embodiment, a reply package including a migration application is sent to the client. The migration application needs to be installed on both the source and the destination platforms. The migration application is a program that sends commands to the parent virtual trusted platform module for causing the serialization of the state of the virtual TPM instance and enables the user to use the extended command set that allows the download of the state of the virtual TPM instance. In another exemplary embodiment, the migration application may include computer useable program code to automatically download the state of the virtual TPM instance and transfer the state to the destination platform for the purpose of recreating the state there. In another exemplary embodiment, the migration application may also include computer useable program code for gathering information about the client system, including buffer size, in order to determine whether the state of the virtual TPM instance may be downloaded in one step or if multiple steps are required.

Figure 4:
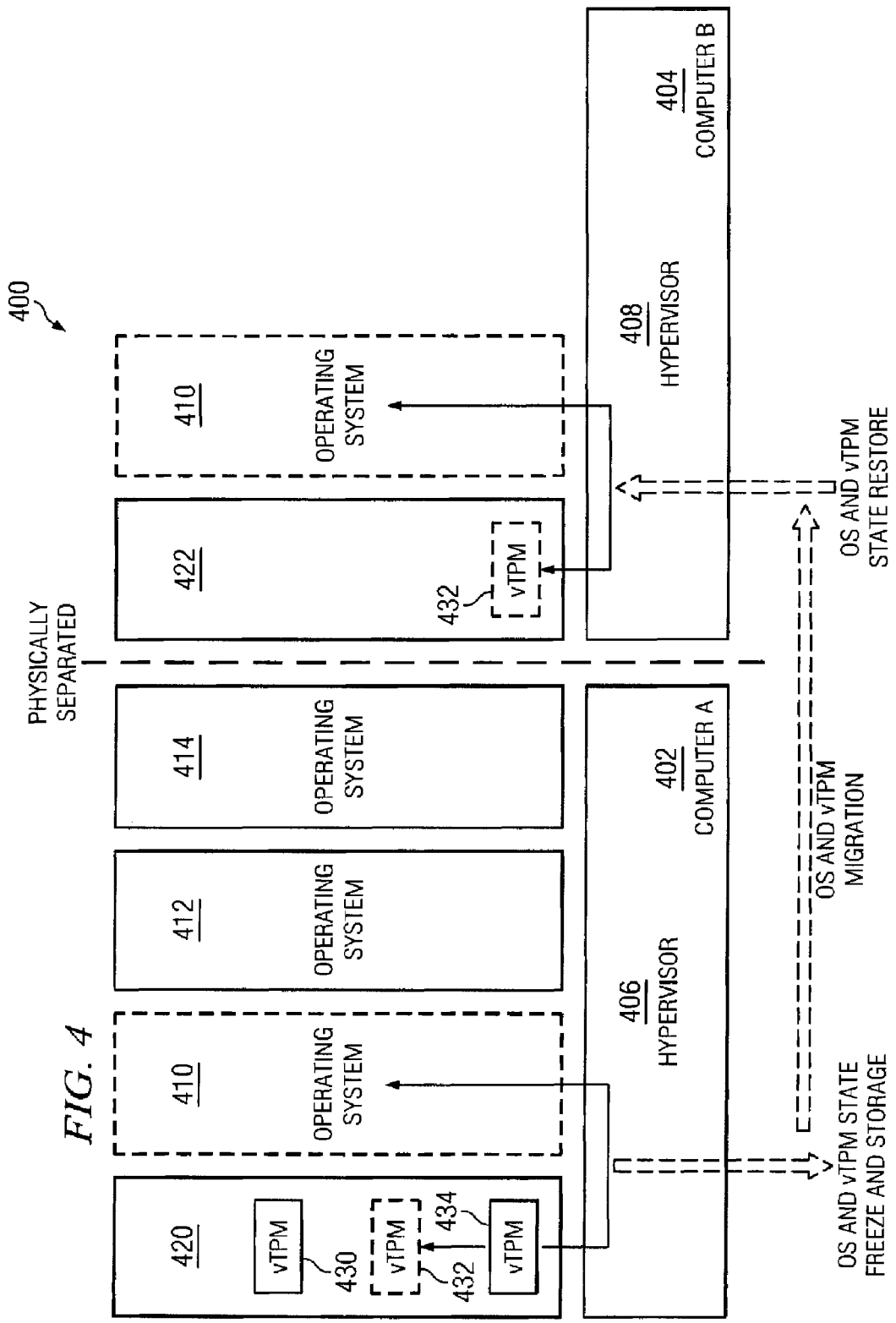
FIG. 4 is a block diagram depicting an example of migrating a virtual TPM instance to a physically separate destination platform, in accordance with an exemplary embodiment of the present invention.

FIG. 4 is a block diagram depicting an example of migrating a virtual TPM instance to a physically separate destination platform, in accordance with an exemplary embodiment of the present invention. FIG. 4 depicts a system, generally denoted by reference number 400, with two physically separate computers, Computer A 402 and Computer B 404. Computer A 402 comprises hypervisor 406, operating systems 410, 412, and 414, and virtual TPM 420. Virtual TPM 420 is host to virtual TPM instances, vTPM 430, 432, and 434. Each virtual TPM instance is associated with one and only one operating system. System 400 shows operating system 410 and vTPM 432 being migrated from Computer A 402 to Computer B 404. As the arrows indicate, operating system 410 and the state information of vTPM 432 are frozen and stored. Operating system 410 and vTPM 432 migrate through hypervisor 406 to hypervisor 408 of Computer B 404. Operating system 410 and the state information of vTPM 432 are restored, as shown. Virtual TPM instance vTPM 432 is restored onto virtual TPM 422 of computer B 404.

FIG. 5 is a diagram of information flow that describes the high level procedure of migrating a virtual TPM instance from a source platform to a destination platform, in accordance with an exemplary embodiment of the present invention. The basis of virtual TPM instance migration is the migration of an asymmetric key pair between a virtual TPM instance on the source platform and a virtual TPM instance on the destination platform. In the example, the parent virtual TPM instance of the to-be-migrated virtual TPM instance on the source platform migrates an asymmetric key to the virtual TPM instance that will be the parent of the to-be-migrated virtual TPM instance on the destination platform (step 502). Asymmetric key migration is a standard feature of the specification of the TPM and is therefore part of the capability of a virtual TPM instance implemented by this standard. The asymmetric key migration makes the same key pair available to both parent virtual TPM instances.

The virtual TPM migration is further based on the migration of a symmetric key from the parent virtual TPM instance on the source platform to the parent virtual TPM instance on the destination platform. The migration application on the source platform requests a symmetric key from the parent virtual TPM instance on the source platform (step 504). In response to the received request, the parent virtual TPM instance on the source platform encrypts a generated and internally-held symmetric key with the public key part of the migrated asymmetric key and returns the encrypted symmetric key to the migration application on the source platform (step 506). The encrypted symmetric key is transferred from the migration application on the source platform to the migration application on the destination platform (step 508). The migration application on the destination platform submits the encrypted symmetric key to the parent virtual TPM instance on the destination platform (step 510). The encrypted symmetric key is decrypted with the private key of the migrated asymmetric key and kept inside the virtual TPM instance that will receive the migrated state information (step 512). A result code, indicating the success or failure of the decryption is returned by the parent virtual TPM instance on the destination platform to the migration application on the destination platform (step 514).

Additionally, the state of the to-be-migrated virtual TPM instance on the source platform is encrypted by the parent virtual TPM instance using the symmetric key (step 516). Then the encrypted state information of the to-be-migrated virtual TPM instance is transferred to the destination platform (step 518) and is decrypted inside the parent virtual TPM instance using the migrated symmetric key (step 520).

Figure 6:
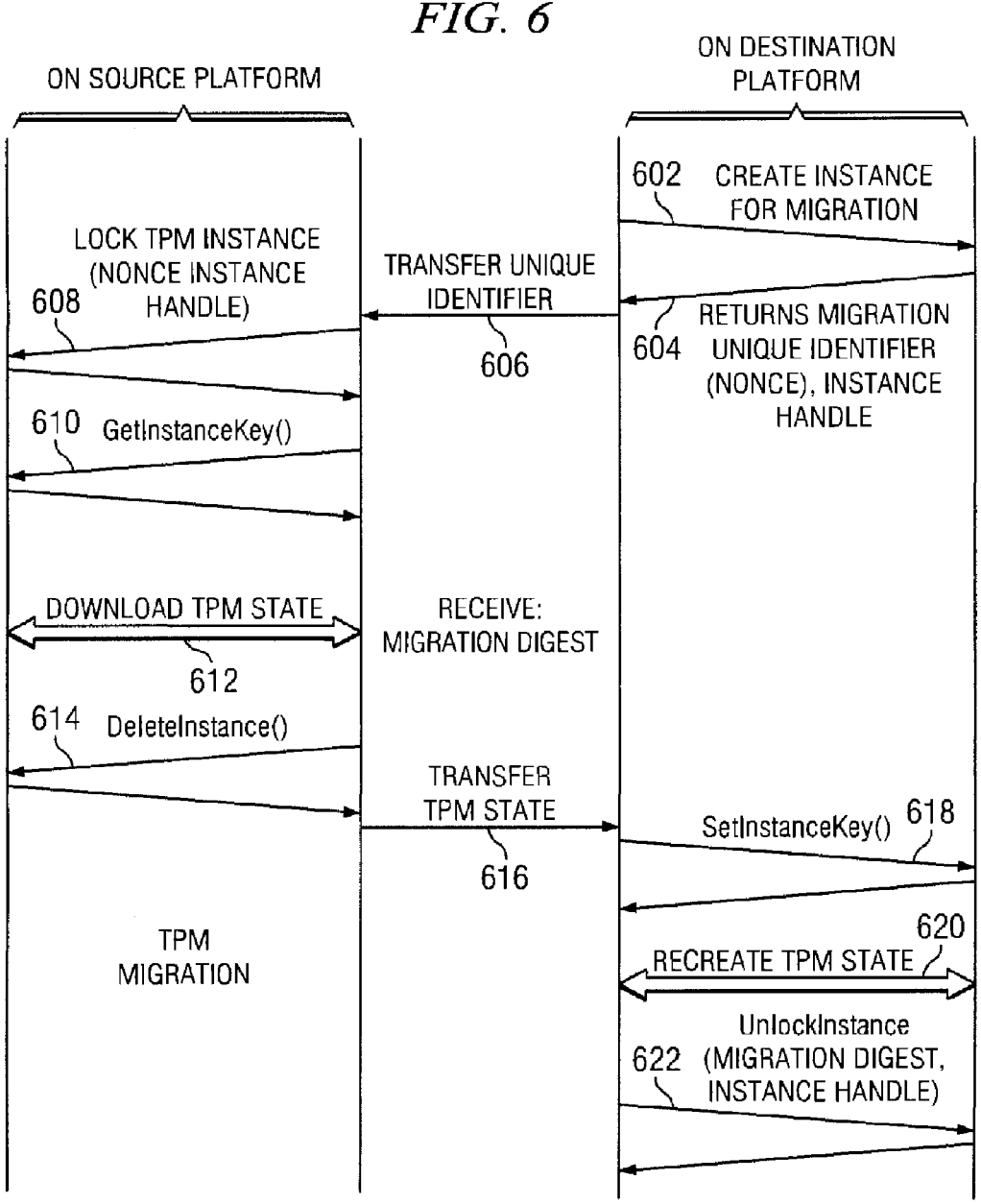
FIG. 6 is a diagram of information flow for migrating a virtual TPM instance, in accordance with an exemplary embodiment of the present invention.

FIG. 6 is a diagram of information flow for migrating a virtual TPM instance, in accordance with an exemplary embodiment of the present invention. The flow begins with the migration application on the destination platform sending a command to the parent virtual TPM instance on the destination platform to create an instance for migrating virtual TPM instance state into (step 602). The parent virtual TPM instance on the destination platform returns a unique migration identifier to the migration application on the destination platform (step 604). The migration application on the destination platform transfers the unique identifier to the migration application on the source platform (step 606). The migration application on the source platform then communicates with the parent virtual TPM instance on the source platform to first lock the virtual TPM instance (step 608) and then to get the instance key (step 610). "Locking" the virtual TPM instance means that the state of the virtual TPM instance is frozen and that the virtual TPM instance will no longer accept normal TPM commands. A locked virtual TPM instance will only accept commands related to migrating the virtual TPM instance. Then the state of the virtual TPM instance is downloaded through the parent virtual TPM instance on the source platform to the migration application on the source platform (step 612). While the state information is downloaded it is deleted from to-be-migrated virtual TPM instance. The migration application on the source platform receives the migration digest as a final piece of state information. Next, the migration application on the source platform deletes the source virtual TPM instance (step 614). The migration application on the source platform transfers the state of the virtual TPM instance to the migration application on the destination platform (step 616). The migration application on the destination platform communicates with the parent virtual TPM instance and sets the TPM instance key (step 618). Then the state of the virtual TPM instance is used to recreate the virtual TPM instance through the parent virtual TPM instance on the destination platform (step 620). The migration application on the destination platform communicates with the parent virtual TPM instance on the destination platform to unlock the instance while also transferring the migration digest (step 622).

FIG. 7 is a diagram of information flow for exporting the state information of a virtual TPM instance in multiple steps, in accordance with an exemplary embodiment of the present invention. Data processing systems often have limits to their buffer size. In some instances, this limitation on the buffer size may prevent the downloading of the state of the virtual TPM instance in a single step. In such cases, the state of the virtual TPM instance needs to be migrated in multiple steps. The information flow, generally denoted by reference number 700, is an illustrative example of performing step 518 of FIG. 5 in multiple steps. Communication is between the migration application on the source platform and the parent virtual TPM instance of the to-be-migrate virtual TPM instance, but the state returned is the state of the to-be-migrate virtual TPM instance. Information flow 700 begins by determining the number of NV RAM areas available. To determine which NV RAM areas are available, the migration application on the source platform sends a command GetCapability(NV RAM areas) to the parent virtual TPM instance on the source platform and the parent virtual TPM instance on the source platform replies to the migration application on the source platform with an array of NVRAM area indices (step 702) available on the to-be-migrate virtual TPM instance. Next, in order to download all NV RAM areas, the migration application on the source platform sends the command GetInstance-Data(NV RAM area "N") and the parent virtual TPM instance on the source platform replies to the migration application on the source platform with a serialized NVRAM area "N" (step 704) of the to-be-migrate virtual TPM instance. As each reply is received by the migration application on the source platfrom, that particular piece of data, area "N" is deleted. In order to determine which owner-evict keys are available, the migration application on the source platform sends the command GetCapability(list of owner-evict keys) and the parent virtual TPM instance on the source platform replies to the migration application on the source platform with the list of available owner-evict keys (step 706) of the to-be-migrated virtual TPM instance. Owner-evict keys are keys that survive rebooting the TPM. Next, the migration application on the source platform downloads all owner-evict keys by sending the command GetInstanceData(owner-evict key K) and the parent virtual TPM instance on the source platform replies to the migration application on the source platform with a serialized owner evict key (step 708) of the to-be-migrated virtual TPM instance. Then the migration application on the source platform downloads all other TPM state information of the to-be-migrate virtual TPM instance.

FIG. 8 is a diagram of information flow for exporting the state information of a virtual TPM instance in a single step, in accordance with an exemplary embodiment of the present invention. FIG. 8 is an illustrative example of performing step 518 in FIG. 5 in a single step. The source platform downloads all the state information of the to-be-migrated virtual TPM instance in one step by the migration application on the source platform sending the command GetInstanceData(everything) to the parent virtual TPM instance on the source platform and the parent virtual TPM instance on the source platform replies.

FIG. 9 is a flowchart illustrating the operation of handling TPM commands, particularly those related to virtual TPM management, in accordance with an exemplary embodiment of the present invention. The operation begins with the TPM waiting to receive a command (step 902). Once a command is received, the TPM determines if the command is a "create TPM instance" command (step 904). If the command is the create TPM instance command (a yes output to step 904), then create the virtual TPM instance, as explained in greater detail in FIG. 10. If the command is not the create TPM instance command (a no output to step 904), then the TPM determines if the command is a "lock TPM instance" command (step 906).

If the command is the lock TPM instance command (a yes output to step 906), then lock the virtual TPM instance, as explained in greater detail in FIG. 11. If the command is not the lock TPM instance command (a no output to step 908), then the TPM determines if the command is a "get TPM instance key" command (step 908).

If the command is the get TPM instance key command (a yes output to step 908), then get the virtual TPM instance key, as explained in greater detail in FIG. 12. If the command is not the get TPM instance key command (a no output to step 908), then the TPM determines if the command is a "get TPM instance data" command (step 910).

Figure 13:
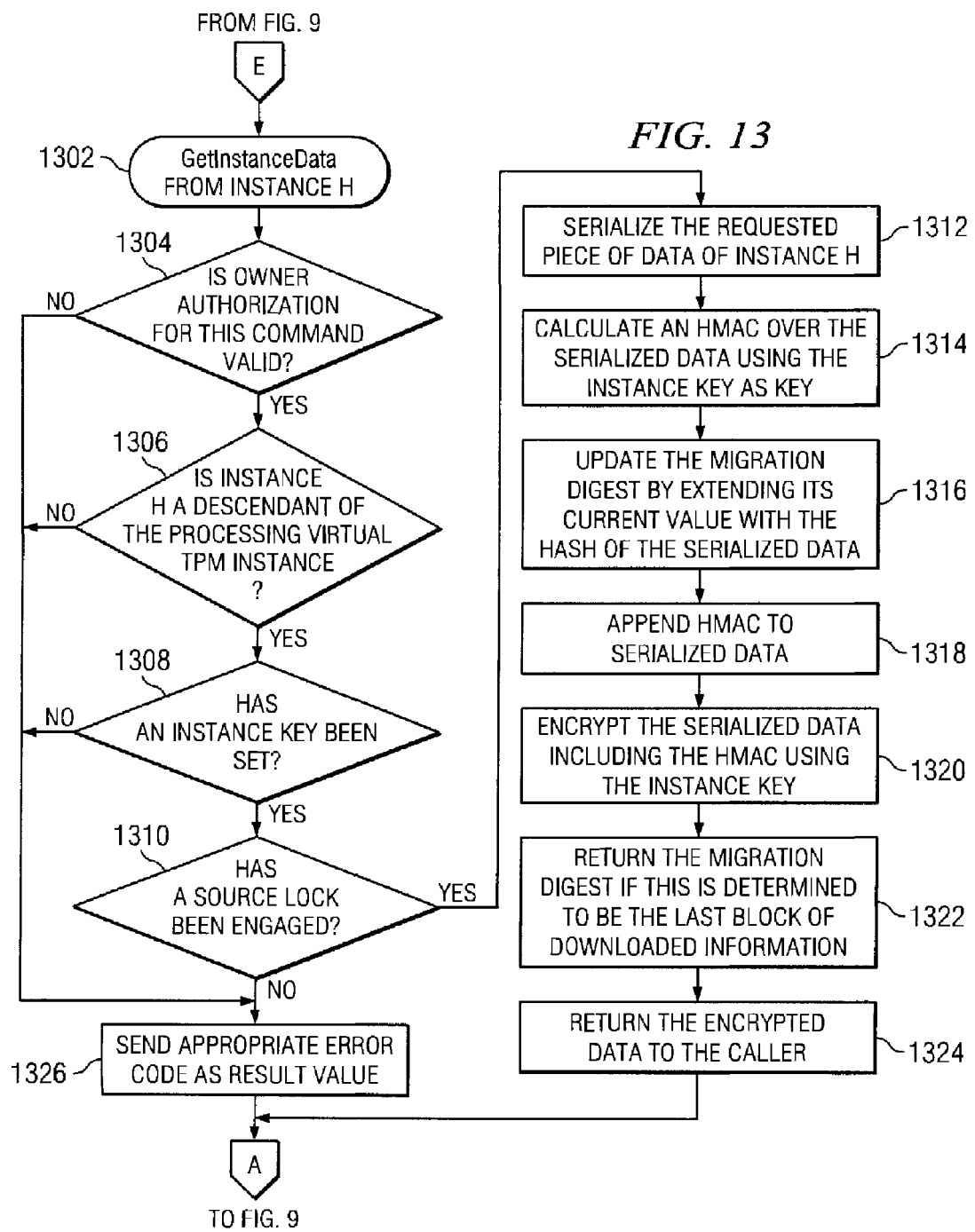
FIG. 13 is a flowchart illustrating the operation of handling the command for getting virtual TPM instance data in accordance with an exemplary embodiment of the present invention.

If the command is the get TPM instance data command (a yes output to step 910), then get the virtual TPM instance data, as explained in greater detail in FIG. 13. If the command is not the get TPM instance data command (a no output to step 910), then the TPM determines if the command is a "delete TPM instance" command (step 912).

Figure 14:
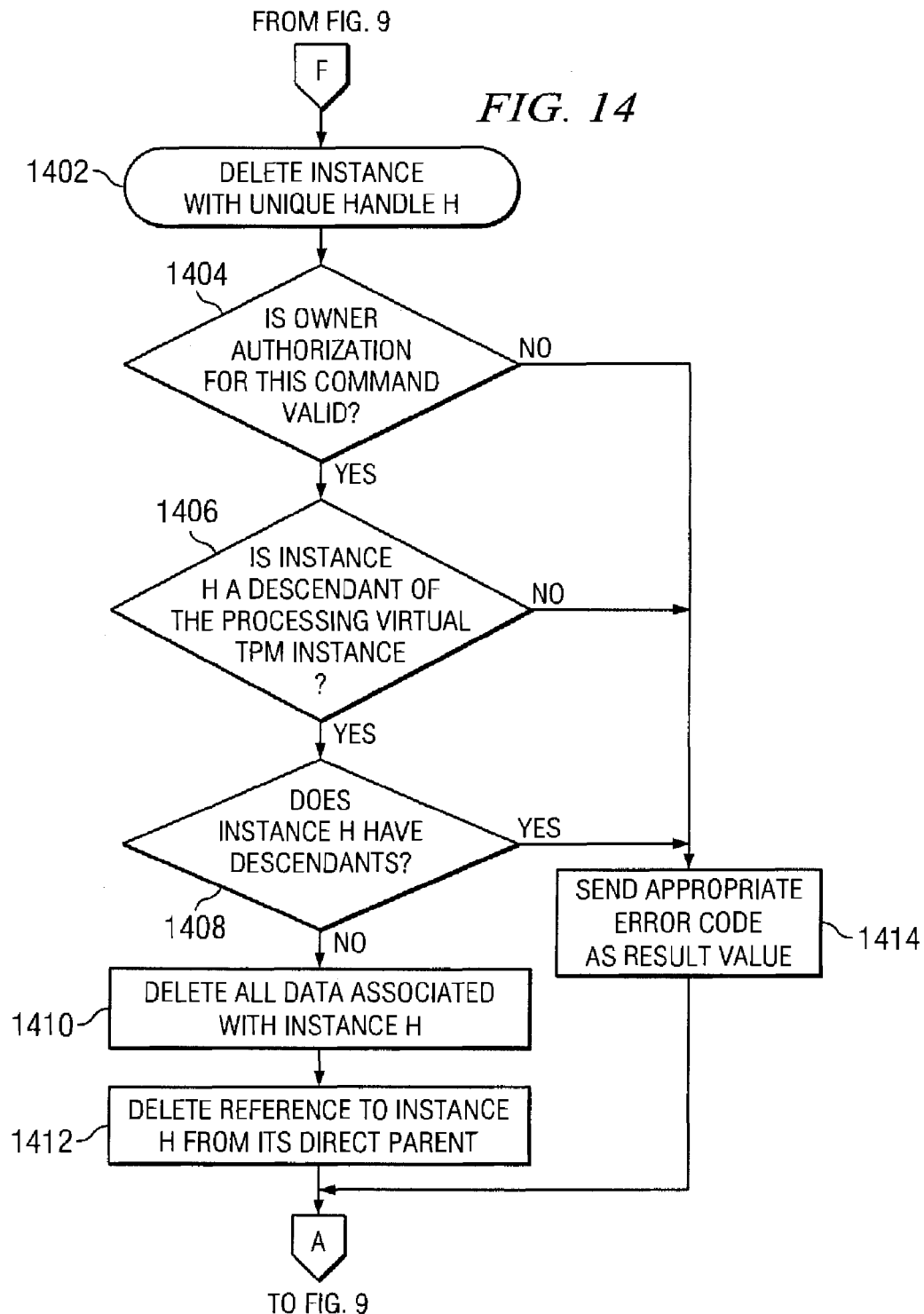
FIG. 14 is a flowchart illustrating the operation of handling the command for deleting a virtual TPM instance in accordance with an exemplary embodiment of the present invention.

If the command is the delete TPM instance command (a yes output to step 912), then delete the virtual TPM instance data, as explained in greater detail in FIG. 14. If the command is not the delete TPM instance command (a no output to step 912), then the TPM determines if the command is a "set TPM instance key" command (step 914).

If the command is the set TPM instance key command (a yes output to step 914), then set the virtual TPM instance key, as explained in greater detail in FIG. 15. If the command is not the set TPM instance key command (a no output to step 914), then the TPM determines if the command is a "set TPM instance data" command (step 916).

If the command is the set TPM instance data command (a yes output to step 916), then set the virtual TPM instance data, as explained in greater detail in FIG. 16. If the command is not the set TPM instance data command (a no output to step 916), then the TPM determines if the command is a "unlock TPM instance" command (step 918).

If the command is the unlock TPM instance command (a yes output to step 918), then unlock the virtual TPM instance, as explained in greater detail in FIG. 17. If the command is not the unlock TPM instance command (a no output to step 918), then the TPM verifies the validity of the command (step 920) and processes it as a normal TPM command, eventually returning to step 902.

FIG. 10 is a flowchart illustrating the operation of handling a create TPM instance command in accordance with an exemplary embodiment of the present invention. In the present example, an empty virtual TPM instance is being created at the destination platform. The operation begins by receiving a command to create an instance as the child of instance P, where instance P is the parent instance (step 1002). Next the operation verifies if owner authorization for the command is valid (step 1004). If the owner authorization for the command is not valid (a no output to step 1004), the appropriate error code is sent as the result value (step 1016) and the operation returns to step 902 of FIG. 9 to wait for a new command to process. If the owner authorization for the command is valid (a yes output to step 1004), the operation determines if instance P is a descendant of the processing virtual TPM instance (step 1006).

If instance P is not a descendant of the processing virtual TPM instance (a no output to step 1006), the appropriate error code is sent as the result value (step 1016) and the operation returns to step 902 of FIG. 9 to wait for a new command to process. If instance P is a descendant of the processing virtual TPM instance (a yes output to step 1006), the operation determines if instance P is a privileged instance (step 1008). A privileged instance is an instance with permission to create other, child instances.

If instance P is not a privileged instance (a no output to step 1008), the appropriate error code is sent as the result value (step 1016) and the operation returns to step 902 of FIG. 9 to wait for a new command to process. If instance P is a privileged instance (a yes output to step 1008), the operation creates a virtual TPM instance as the child of instance P (step 1010). The virtual TPM is assigned a unique instance handle H and a unique migration identifier (step 1010). A destination lock is engaged for instance H (step 1012). As a lock has been engaged, instance H will now only accept commands related to migration of a virtual TPM instance and thus will remain empty until another virtual TPM instance is migrated to it or until it has been unlocked. Unique instance handle H and the migration identifier are returned to the caller (step 1014) and the operation returns to step 902 of FIG. 9 to wait for a new command to process.

FIG. 11 is a flowchart illustrating the operation of handling a lock TPM instance command in accordance with an exemplary embodiment of the present invention. The operation begins by receiving a command to lock a virtual TPM instance, instance H, associated with a unique migration identifier (step 1102). Next the operation verifies if owner authorization for the command is valid (step 1104). If the owner authorization for the command is not valid (a no output to step 1104), the appropriate error code is sent as the result value (step 1120) and the operation returns to step 902 of FIG. 9 to wait for a new command to process. If the owner authorization for the command is valid (a yes output to step 1104), the operation determines if instance H is a descendant of the processing virtual TPM instance (step 1106). If instance H is not a descendant of the processing virtual TPM instance (a no output to step 1106), the appropriate error code is sent as the result value (step 1120) and the operation returns to step 902 of FIG. 9 to wait for a new command to process.

If instance H is a descendant of the processing virtual TPM instance (a yes output to step 1106), the operation determines if the destination lock is engaged (step 1110). If the destination lock is engaged (a yes output to step 1110), the appropriate error code is sent as the result value (step 1120) and the operation returns to step 902 of FIG. 9 to wait for a new command to process. If the destination lock is not engaged (a no output to step 1110), the operation engages a source lock for instance P, which prevents instance P from accepting any TPM commands except for those commands related to migrating the TPM (step 1112). The operation initializes the migration session to the unique migration identifier for instance H (step 1114). The operation then initializes the migration digest (step 1116). The migration digest is an example of integrity data that is used to detect changes in the exported state of a virtual TPM instance. A result code, indicating the success of failure of the operation, is returned (step 1118) and then the operation returns to step 902 of FIG. 9 to wait for a new command to process.

FIG. 12 is a flowchart illustrating the operation of handling a get TPM instance key command in accordance with an exemplary embodiment of the present invention. The operation begins by receiving a command to get an instance key for a virtual TPM instance, instance H, using storage key S for encryption (step 1202). Next the operation verifies if owner authorization for the command is valid (step 1204). If the owner authorization for the command is not valid (a no output to step 1204), the appropriate error code is sent as the result value (step 1220) and the operation returns to step 902 of FIG. 9 to wait for a new command to process. If the owner authorization for the command is valid (a yes output to step 1204), the operation determines if instance H is a descendant of the processing virtual TPM instance (step 1206). If instance H is not a descendant of the processing virtual TPM instance (a no output to step 1206), the appropriate error code is sent as the result value (step 1220) and the operation returns to step 902 of FIG. 9 to wait for a new command to process.

If instance H is a descendant of the processing virtual TPM instance (a yes output to step 1206), the operation determines if the authorization of storage key S is valid (step 1208). If the authorization of storage key S is not valid (a no output to step 1208), the appropriate error code is sent as the result value (step 1220) and the operation returns to step 902 of FIG. 9 to wait for a new command to process. If authorization of storage key S is valid (a yes output to step 1208), on instance H, the operation creates a random symmetric key and forms a symmetric key structure with the random symmetric key (step 1210). Then on instance H, the operation creates a random number to be used as an HMAC key for instance H (step 1212). The operation stores the random symmetric key on instance H (step 1214). The operation then stores the HMAC key on instance H (step 1216). On instance H, the operation concatenates the symmetric key structure and the HMAC key and encrypts the concatenated item with key S (step 1218). The operation returns the encrypted item to the caller (step 1222) and the operation returns to step 902 of FIG. 9 to wait for a new command to process.

FIG. 13 is a flowchart illustrating the operation of handling a get TPM instance data command in accordance with an exemplary embodiment of the present invention. The operation begins by receiving a command to get instance data from a virtual TPM instance, instance H (step 1302). Next the operation verifies if owner authorization for the command is valid (step 1304). If the owner authorization for the command is not valid (a no output to step 1304), the appropriate error code is sent as the result value (step 1326) and the operation returns to step 902 of FIG. 9 to wait for a new command to process. If the owner authorization for the command is valid (a yes output to step 1304), the operation determines if instance H is a descendant of the processing virtual TPM instance (step 1306). If instance H is not a descendant of the processing virtual TPM instance (a no output to step 1306), the appropriate error code is sent as the result value (step 1326) and the operation returns to step 902 of FIG. 9 to wait for a new command to process.

If instance H is a descendant of the processing virtual TPM instance (a yes output to step 1306), the operation determines if an instance key has been set (step 1308). If the instance key has not been sent (a no output to step 1308), the appropriate error code is sent as the result value (step 1326) and the operation returns to step 902 of FIG. 9 to wait for a new command to process. If an instance key has been set (a yes output to step 1308), the operation determines if a source lock has been engaged (step 1310). If a source lock has not been engaged (a no output to step 1310), the appropriate error code is sent as the result value (step 1326) and the operation returns to step 902 of FIG. 9 to wait for a new command to process. If a source lock has been engaged (a yes output to step 1310), the operation serializes the requested piece of data of instance H (step 1312). The operation calculates an HMAC over the serialized data using the instance HMAC key as the key (step 1314). The operation updates the migration digest by extending its current value with the hash of the serialized data (step 1316). The operation appends the HMAC to the serialized data (step 1318). The operation encrypts the serialized data including the HMAC using the instance key (step 1320). The operation returns the migration digest if this data is determined to be the last block of downloaded information (step 1322). The operation returns the encrypted data to the caller (step 1324) and the operation returns to step 902 of FIG. 9 to wait for a new command to process.

FIG. 14 is a flowchart illustrating the operation of handling a delete TPM instance command in accordance with an exemplary embodiment of the present invention. The operation begins by receiving a command to delete a virtual TPM instance with unique handle H, instance H (step 1402). Next the operation verifies if owner authorization for the command is valid (step 1404). If the owner authorization for the command is not valid (a no output to step 1404), the appropriate error code is sent as the result value (step 1414) and the operation returns to step 902 of FIG. 9 to wait for a new command to process. If the owner authorization for the command is valid (a yes output to step 1404), the operation determines if instance H is a descendant of the processing virtual TPM instance (step 1406). If instance H is not a descendant of the processing virtual TPM instance (a no output to step 1406), the appropriate error code is sent as the result value (step 1414) and the operation returns to step 902 of FIG. 9 to wait for a new command to process.

If instance H is a descendant of the processing virtual TPM instance (a yes output to step 1406), the operation determines if instance H has any descendants (step 1408). If instance H has descendants (a yes output to step 1408), the appropriate error code is sent as the result value (step 1414) and the operation returns to step 902 of FIG. 9 to wait for a new command to process. If instance H does not have any descendants (a no output to step 1408), the operation deletes all data associated with instance H (step 1410). The operation deletes all reference to instance H from instance H's direct parent (step 1412) and the operation returns to step 902 of FIG. 9 to wait for a new command to process.

FIG. 15 is a flowchart illustrating the operation of handling a set TPM instance key command in accordance with an exemplary embodiment of the present invention. The operation begins by receiving a command to set an instance key for a virtual TPM instance, instance H, using storage key S for encryption (step 1502). Next the operation verifies if owner authorization for the command is valid (step 1504). If the owner authorization for the command is not valid (a no output to step 1504), the appropriate error code is sent as the result value (step 1518) and the operation returns to step 902 of FIG. 9 to wait for a new command to process. If the owner authorization for the command is valid (a yes output to step 1504), the operation determines if instance H is a descendant of the processing virtual TPM instance (step 1506). If instance H is not a descendant of the processing virtual TPM instance (a no output to step 1506), the appropriate error code is sent as the result value (step 1518) and the operation returns to step 902 of FIG. 9 to wait for a new command to process.

If instance H is a descendant of the processing virtual TPM instance (a yes output to step 1506), the operation determines if the authorization of storage key S is valid (step 1508). If the authorization of storage key S is not valid (a no output to step 1508), the appropriate error code is sent as the result value (step 1518) and the operation returns to step 902 of FIG. 9 to wait for a new command to process. If authorization of storage key S is valid (a yes output to step 1508), the operation decrypts the given encrypted item using the private key of storage key S and extracts a symmetric key structure and an HMAC key (step 1510). Then the operation determines if the symmetric key structure is valid (step 1512). If the symmetric key structure is not valid (a no output to step 1512), the appropriate error code is sent as the result value (step 1518) and the operation returns to step 902 of FIG. 9 to wait for a new command to process. If the symmetric key structure is valid (a yes output to step 1512), the operation stores the symmetric key as part of instance H's state (step 1514). The operation then stores the HMAC key as part of instance H's state (step 1516) and the operation returns to step 902 of FIG. 9 to wait for a new command to process.

FIG. 16 is a flowchart illustrating the operation of handling a set TPM instance data command in accordance with an exemplary embodiment of the present invention. The operation begins by receiving a command to set the instance data of a virtual TPM instance, instance H (step 1602). Next the operation verifies if owner authorization for the command is valid (step 1604). If the owner authorization for the command is not valid (a no output to step 1604), the appropriate error code is sent as the result value (step 1622) and the operation returns to step 902 of FIG. 9 to wait for a new command to process. If the owner authorization for the command is valid (a yes output to step 1604), the operation determines if instance H is a descendant of the processing virtual TPM instance (step 1606). If instance H is not a descendant of the processing virtual TPM instance (a no output to step 1606), the appropriate error code is sent as the result value (step 1622) and the operation returns to step 902 of FIG. 9 to wait for a new command to process.

If instance H is a descendant of the processing virtual TPM instance (a yes output to step 1606), the operation determines if an instance key has been set (step 1608). If the instance key has not been set (a no output to step 1608), the appropriate error code is sent as the result value (step 1622) and the operation returns to step 902 of FIG. 9 to wait for a new command to process. If an instance key has been set (a yes output to step 1608), the operation determines if a destination lock has been engaged (step 1610). If a destination lock has not been engaged (a no output to step 1610), the appropriate error code is sent as the result value (step 1622) and the operation returns to step 902 of FIG. 9 to wait for a new command to process. If a destination lock has been engaged (a yes output to step 1610), the operation decrypts the data using the instance key (step 1612). The operation then determines if the HMAC found in the decrypted data is correct (step 1614). If the HMAC found in the decrypted data is not correct (a no output to step 1614), the appropriate error code is sent as the result value (step 1622) and the operation returns to step 902 of FIG. 9 to wait for a new command to process. If the HMAC found in the decrypted data is correct (a yes output to step 1614), the operation determines if the unique migration identifier found in the decrypted data is correct (step 1616). If the unique migration identifier found in the decrypted data is not correct (a no output to step 1616), the appropriate error code is sent as the result value (step 1622) and the operation returns to step 902 of FIG. 9 to wait for a new command to process. If the unique migration identifier found in the decrypted data is correct (a yes output to step 1616), the operation recreates the state of instance H by deserializing the decrypted byte stream (step 1618). The operation extends the migration digest of instance H with the decrypted data (step 1620) and the operation returns to step 902 of FIG. 9 to wait for a new command to process.

FIG. 17 is a flowchart illustrating the operation of handling an unlock TPM instance command in accordance with an exemplary embodiment of the present invention. The operation begins by receiving a command to unlock a virtual TPM instance, instance H, associated with a migration digest (step 1702). Next the operation verifies if owner authorization for the command is valid (step 1704). If the owner authorization for the command is not valid (a no output to step 1704), the appropriate error code is sent as the result value (step 1716) and the operation returns to step 902 of FIG. 9 to wait for a new command to process. If the owner authorization for the command is valid (a yes output to step 1704), the operation determines if instance H is a descendant of the processing virtual TPM instance (step 1706). If instance H is not a descendant of the processing virtual TPM instance (a no output to step 1706), the appropriate error code is sent as the result value (step 1716) and the operation returns to step 902 of FIG. 9 to wait for a new command to process.

If instance H is a descendant of the processing virtual TPM instance (a yes output to step 1706), the operation determines if the passed and internal migration digests match (step 1708). If the passed and internal migration digests do not match (a no output to step 1708), the appropriate error code is sent as the result value (step 1716) and the operation returns to step 902 of FIG. 9 to wait for a new command to process. If the passed and internal migration digests match (a yes output to step 1708), the operation clears the migration session with the unique migration identifier of instance H (step 1710). The operation disengages the destination lock of instance H (step 1712). The operation disengages the source lock of instance H (step 1714) and the operation returns to step 902 of FIG. 9 to wait for a new command to process.

Thus the present invention provides a computer implemented method, data processing system, and computer program product for migrating a trusted platform module instance. The method also ensures the uniqueness and completeness of the migrated trusted platform module instance.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code should preferably be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating a virtual trusted platform module instance, the computer implemented method comprising:
    locking the virtual trusted platform module instance, wherein locking the virtual trusted platform module instance comprises freezing a state of a virtual trusted module instance, wherein once frozen, the virtual trusted module instance will no longer accept normal trusted platform module commands, but will only accept commands related to migrating the virtual trusted module, wherein the state of the virtual trusted platform module instance may be exported after the virtual trusted module instance has been locked and wherein the virtual trusted platform module instance cannot be unlocked once the virtual trusted platform module instance has been locked,
    exporting the state of the virtual trusted platform module instance through a parent virtual trusted platform module instance on a source platform, wherein the parent virtual trusted platform module instance on the source platform has control over a life-cycle of the virtual trusted platform module instance on the source platform; and
    importing the state of the virtual trusted platform module instance through a parent virtual trusted platform module instance on a destination platform, wherein the parent virtual trusted platform module instance on the destination platform has control over a life-cycle of the virtual trusted platform module instance on the destination platform.

2. The computer implemented method of claim 1, wherein the source platform and the destination platform are on different physical platforms.

3. The computer implemented method of claim 1, further comprising:
    deleting the state of the virtual trusted platform module instance on the source platform.

4. The computer implemented method of claim 1, wherein the state of the virtual trusted platform module instance is streamed from the source platform to the destination platform using a transfer protocol based on a network transmission protocol.

5. The computer implemented method of claim 1, wherein the state of the virtual trusted platform module instance is exported in a plurality of steps and wherein the state of the virtual trusted platform module instance is imported in a plurality of steps.

6. The computer implemented method of claim 1, further comprising:
    adding integrity data to the state of the virtual trusted platform module instance by the parent virtual trusted platform module instance on the source platform; and
    validating the integrity data by the parent virtual trusted platform module instance on the destination platform.

7. The computer implemented method of claim 6, wherein the integrity data is a migration digest.

8. The computer implemented method of claim 7, further comprising:
    wherein exporting the state of the virtual trusted platform module instance comprises serializing each piece of the state of the virtual trusted platform module instance into a byte stream, wherein the parent virtual trusted platform module instance on the source platform forms each serialized byte stream into a source digest;

accumulating all source digests to form a final source digest;

exporting the final source digest;

receiving the serialized byte streams by the parent virtual trusted platform module instance on the destination platform, wherein the parent virtual trusted platform module instance on the destination platform forms each serialized byte stream into a destination digest;

accumulating all the destination digests to form a final destination digest; and comparing the final source digest to the final destination digest.

9. The computer implemented method of claim 1, further comprising:

preventing the state of the virtual trusted platform module instance from being imported by a plurality of parent virtual trusted platform module instances.

10. The computer implemented method of claim 9, wherein the step of preventing the state of the virtual trusted platform module instance from being imported by a plurality of parent virtual trusted platform module instances comprises:

generating a unique migration identifier;

adding the unique migration identifier to the state of the trusted platform module instance; and verifying the migration identifier by the destination trusted platform module instance.

11. The computer implemented method of claim 10, wherein the parent virtual trusted platform module instance on the destination platform generates the unique migration identifier and the unique migration identifier is sent to the parent virtual trusted platform module instance on the source platform and wherein the parent virtual trusted platform module instance on the source platform adds the unique migration identifier to the state of the virtual trusted platform module instance.

12. The computer implemented method of claim 1, further comprising:

encrypting the state of the virtual trusted platform module instance before the state of the virtual trusted platform module instance is exported; and decrypting the state of the virtual trusted platform module instance after the state of the virtual trusted platform module instance is imported.

13. The computer implemented method of claim 12, wherein the steps of exporting and importing the state of the virtual trusted platform module instance comprises:

exchanging a symmetric key between the parent virtual trusted platform module instance on the source platform and the parent virtual trusted platform instance on the destination platform; and encrypting the state of the virtual trusted platform module instance on the source platform with the symmetric key; and decrypting the state of the virtual trusted platform module instance on the destination platform with the symmetric key.

14. The computer implemented method of claim 13, wherein the step of exchanging the symmetric key between the parent virtual trusted platform module instance on the source platform and the parent virtual trusted platform module instance on the destination platform comprises:

generating a random symmetric key by the parent virtual trusted platform module instance on the source platform;

encrypting the random symmetric key using a public key; and exporting the encrypted random symmetric key to the parent virtual trusted platform module instance on the destination platform, wherein the parent virtual trusted platform module instance on the destination platform decrypts the encrypted random symmetric key by using a private key associated with the public key.

15. The computer implemented method of claim 1, further comprising:

appending a message authentication code to the state of the virtual trusted platform module instance; and verifying the message authentication code.

16. The computer implemented method of claim 15, further comprising:

generating a key used for the message authentication code by the parent virtual trusted platform module instance on the source platform;

exchanging the key between the parent virtual trusted platform module on the source platform with the parent virtual trusted platform module on the destination platform; and wherein the key is used for verification of the message authentication code by the parent virtual trusted platform module instance on the destination platform.

17. The computer implemented method of claim 16, wherein the steps of generating the key for the message authentication code and exchanging the key between the parent virtual trusted platform module on the source platform with the parent virtual trusted platform module on the destination platform comprises:

generating an authentication key by the parent virtual trusted platform module instance on the source platform; and encrypting the authentication key with a public key by the parent virtual trusted platform module instance on the source platform; and decrypting the authentication key using a private key associated with the public key by the parent virtual trusted platform module instance on the destination platform.

18. The computer implemented method of claim 1, further comprising:

locking a child virtual trusted platform module instance on the destination platform, wherein locking the child virtual trusted platform module instance comprises freezing the state of the child trusted module instance, wherein once frozen, the child trusted module instance will no longer accept normal trusted platform module commands, but will only accept commands related to migrating the virtual trusted module, wherein the state of the virtual trusted platform module is imported after the child virtual trusted platform module instance on the destination platform has been locked and wherein the child virtual trusted platform module instance on the destination platform cannot be unlocked unless all the state of the virtual trusted platform module has been imported.

19. A computer program product comprising a non-transitory computer usable medium including computer usable program code for the migration of virtual trusted platform module instances, said computer program product comprising:

computer usable program code for locking a virtual trusted platform module instance, wherein locking the virtual trusted platform module instance comprises freezing a state of the virtual trusted module instance, wherein once frozen, the virtual trusted module instance will no longer accept normal trusted platform module commands, but will only accept commands related to migrating the virtual trusted module, wherein the state of the virtual trusted platform module instance may be exported after the virtual trusted module instance has been locked and wherein the virtual trusted platform module instance cannot be unlocked once the virtual trusted platform module instance has been locked;

computer usable program code for exporting the state of the virtual trusted platform module instance through a parent virtual trusted platform module instance on a source platform, wherein the parent virtual trusted platform module instance on the source platform has control over a life-cycle of the virtual trusted platform module instance on the source platform; and computer usable program code for importing the state of the virtual trusted platform module instance through a parent virtual trusted platform module instance on a destination platform, wherein the parent virtual trusted platform module instance on the destination platform has control over a life-cycle of the virtual trusted platform module instance on the destination platform.

20. The computer program product of claim 19, further comprising:
    computer usable program code for deleting the state of the virtual trusted platform module instance on the source platform.

21. The computer program product of claim 19, wherein the computer useable program code for exporting the state of the virtual trusted platform module instance comprises computer useable program code for exporting the state of the virtual trusted platform module instance in a plurality of steps and wherein the computer useable program code for importing the state of the virtual trusted platform module instance comprises computer useable program code for importing the virtual trusted platform module instance in a plurality of steps.

22. The computer program product of claim 19, further comprising:
    computer usable program code for adding integrity data to the state of the virtual trusted platform module instance by the parent virtual trusted platform module instance on the source platform; and
    computer usable program code for validating the integrity data by the parent virtual trusted platform module instance on the destination platform.

23. The computer program product of claim 22, further comprising:
    wherein the integrity data is a migration digest;
    wherein the computer usable program code exporting the state of the virtual trusted platform module instance comprises computer usable program code for serializing each piece of the state of the virtual trusted platform module instance into a byte stream, wherein the parent virtual trusted platform module instance on the source platform forms each serialized byte stream into a source digest;
    computer usable program code for accumulating all source digests to form a final source digest;
    computer usable program code for exporting the final source digest;
    computer usable program code for receiving the serialized byte streams by the parent virtual trusted platform module instance on the destination platform, wherein the parent virtual trusted platform module instance on the destination platform forms each serialized byte stream into a destination digest;
    computer usable program code for accumulating all destination digests to form a final destination digest; and
    computer usable program code for comparing the final source digest to the final destination digest.

24. The computer program product of claim 19, further comprising:
    computer usable program code for preventing the state of the virtual trusted platform module instance from being imported by a plurality of parent virtual trusted platform module instances.

25. The computer program product of claim 24, wherein the computer usable program code for preventing the state of the virtual trusted platform module instance from being imported by a plurality of parent virtual trusted platform module instances comprises:
    computer usable program code for generating a unique migration identifier;
    computer usable program code for adding the unique migration identifier to the state of the trusted platform module instance; and
    computer usable program code for verifying the migration identifier by the destination trusted platform module instance.

26. The computer program product of claim 19, further comprising:
    computer usable program code for encrypting the state of the virtual trusted platform module instance before the state of the virtual trusted platform module instance is exported; and
    computer usable program code for decrypting the state of the virtual trusted platform module instance after the state of the virtual trusted platform module instance is imported.

27. The computer program product of claim 26, wherein the computer usable program code for encrypting the state of the virtual trusted platform module instance and the computer usable program code for decrypting the state of the virtual trusted platform module instance comprises:
    computer usable program code for generating a random symmetric key by the parent virtual trusted platform module instance on the source platform;
    computer usable program code for encrypting the random symmetric key using a public key; and
    computer usable program code for exporting the encrypted random symmetric key to the parent virtual trusted platform module instance on the destination platform, wherein the parent virtual trusted platform module instance on the destination platform decrypts the encrypted random symmetric key by using a private key associated with the public key;
    computer usable program code for encrypting the state of a virtual trusted platform module instance on the source platform by the parent virtual trusted platform module instance using the random symmetric key; and
    computer usable program code for decrypting the state of the virtual trusted platform module instance on the destination platform by the parent virtual trusted platform module instance using the random symmetric key.

28. The computer program product of claim 19, further comprising:
    computer usable program code for appending a message authentication code to the state of the virtual trusted platform module instance; and
    computer usable program code for verifying the message authentication code.

29. The computer program product of claim 28, wherein the computer usable program code for appending a message authentication code to the state of the virtual trusted platform module instance and the computer usable program code for verifying the message authentication code comprises:
- computer usable program code for generating an authentication key by the parent virtual trusted platform module instance on the source platform;
- computer usable program code for encrypting the authentication key with a public key by the parent virtual trusted platform module instance on the source platform;
- computer usable program code for exporting the encrypted authentication key by the parent virtual trusted platform module instance on the source platform;
- computer usable program code for importing the encrypted authentication key by the parent virtual trusted platform module instance on the destination platform;
- computer usable program code for decrypting the authentication key using a private key associated with the public key by the parent virtual trusted platform module instance on the destination platform;
- computer usable program code for appending a message authentication code to the state of a virtual trusted platform module instance on the source platform by the parent virtual trusted platform module instance using the authentication key; and
- computer usable program code for verifying the appended message authentication code by the parent virtual trusted platform module instance on the destination platform using the authentication key.

30. The computer program product of claim 19, further comprising:
- computer usable program code for locking a child virtual trusted platform module instance on the destination platform, wherein locking the child virtual trusted platform module instance comprises freezing the state of the child trusted module instance, wherein once frozen, the child trusted module instance will no longer accept normal trusted platform module commands, but will only accept commands related to migrating the virtual trusted module, wherein the state of the virtual trusted platform module is imported after the child virtual trusted platform module instance on the destination platform has been locked and wherein the child virtual trusted platform module instance on the destination platform cannot be unlocked unless all the state of the virtual trusted platform module has been imported.

31. A system for the migration of virtual trusted platform module instances, comprising:
- a storage device, wherein the storage device stores computer usable program code; and
- a processor, wherein the processor executes the computer usable program code to: lock the virtual trusted platform module instance, wherein locking the virtual trusted platform module instance comprises freezing a state of a virtual trusted module instance, wherein once frozen, the virtual trusted module instance will no longer accept normal trusted platform module commands, but will only accept commands related to migrating the virtual trusted module, wherein the state of the virtual trusted platform module instance may be exported after the virtual trusted module instance has been locked and wherein the virtual trusted platform module instance cannot be unlocked once the virtual trusted platform module instance has been locked; and to export the state of the virtual trusted platform module instance through a parent virtual trusted platform module instance on a source platform; and import the state of the virtual trusted platform module instance through a parent virtual trusted platform module instance on a destination platform.

* * * * *